United States Patent
Martinsson

(10) Patent No.: US 11,724,620 B2
(45) Date of Patent: Aug. 15, 2023

(54) METHOD OF CONTROLLING A BATTERY SYSTEM IN A VEHICLE

(71) Applicant: VOLVO TRUCK CORPORATION, Gothenburg (SE)

(72) Inventor: Torbjörn Martinsson, Valla (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 152 days.

(21) Appl. No.: 17/257,809

(22) PCT Filed: Jul. 5, 2018

(86) PCT No.: PCT/EP2018/068262
§ 371 (c)(1),
(2) Date: Jan. 4, 2021

(87) PCT Pub. No.: WO2020/007474
PCT Pub. Date: Jan. 9, 2020

(65) Prior Publication Data
US 2021/0300206 A1 Sep. 30, 2021

(51) Int. Cl.
*B60L 58/13* (2019.01)
*B60L 58/22* (2019.01)
(Continued)

(52) U.S. Cl.
CPC ............... *B60L 58/13* (2019.02); *B60L 58/14* (2019.02); *B60L 58/22* (2019.02);
(Continued)

(58) Field of Classification Search
CPC .......... B60L 58/13; B60L 58/14; B60L 58/22; B60L 2200/18; B60L 58/15; B60L 58/18;
(Continued)

(56) References Cited

U.S. PATENT DOCUMENTS 5,898,291 A   4/1999  Hall
6,140,800 A * 10/2000 Peterson ............... H02J 7/0018
                                                    320/128
(Continued)

FOREIGN PATENT DOCUMENTS

CN    108656968 B  *  1/2022  .............. B60L 1/003
DE    102012201602 A1   8/2013
(Continued)

OTHER PUBLICATIONS

International Search Report and Written Opinion dated Mar. 14, 2019 in corresponding International PCT Application No. PCT/EP2018/068262, 10 pages.
(Continued)

*Primary Examiner* — M Baye Diao
(74) *Attorney, Agent, or Firm* — Venable LLP; Jeffri A. Kaminski

(57) ABSTRACT

A method of controlling a battery system in a vehicle during discharging or charging includes temporarily interrupting discharging or charging of the identified battery cell with the lowest or highest state charge level; continuing discharging or charging the remaining battery cells; sequentially temporarily interrupting discharging or charging a battery cell in each one of the other battery stacks; controlling a duration of the sequentially temporarily interrupting discharging or charging a battery cell in each one of the other battery stacks based on a battery system characteristic; comparing a monitored state charge levels of the remaining battery cells with the state charge level of the lowest or highest battery cell of the corresponding battery stack; and resuming discharging or charging of the identified battery cell when state charge levels of the remaining battery cells of the set of battery cells corresponds to the state charge level of the identified battery cell.

16 Claims, 3 Drawing Sheets

(51) Int. Cl.
  *B60L 58/14* (2019.01)
  *H01M 10/48* (2006.01)
  *H02J 7/00* (2006.01)

(52) U.S. Cl.
  CPC ......... *H01M 10/482* (2013.01); *H02J 7/0019* (2013.01); *B60L 2200/18* (2013.01)

(58) Field of Classification Search
  CPC .. H01M 10/482; H02J 7/0019; H02J 7/00302; H02J 7/00306; H02J 2310/48; H02J 7/0029; Y02E 60/10; Y02T 10/70; Y02T 10/7072; B60Y 2200/91
  USPC ........................................................ 320/132
  See application file for complete search history.

(56) References Cited

U.S. PATENT DOCUMENTS

| | | | | |
|---|---|---|---|---|
| 6,150,795 | A * | 11/2000 | Kutkut | H02J 7/0018 320/118 |
| 8,508,191 | B2 | 8/2013 | Kim et al. | |
| 9,035,611 | B2 * | 5/2015 | Kikuchi | B60L 50/60 320/116 |
| 9,296,348 | B2 * | 3/2016 | Yano | B60L 50/16 |
| 9,337,683 | B2 * | 5/2016 | Phillips | B60L 1/00 |
| 10,574,063 | B2 * | 2/2020 | Hellgren | B60L 58/22 |
| 10,581,253 | B2 * | 3/2020 | Preindl | H02J 7/345 |
| 11,084,391 | B2 * | 8/2021 | Rasmussen | B60L 50/64 |
| 2009/0066291 | A1 * | 3/2009 | Tien | H02J 7/0016 320/118 |
| 2010/0261048 | A1 | 10/2010 | Kim et al. | |
| 2012/0293129 | A1 * | 11/2012 | Naghshtabrizi | H02J 7/0016 320/118 |
| 2013/0229152 | A1 * | 9/2013 | Kurimoto | B60L 58/13 320/126 |
| 2013/0249491 | A1 | 9/2013 | Suzuki et al. | |
| 2014/0009092 | A1 | 1/2014 | Ma et al. | |
| 2017/0104350 | A1 * | 4/2017 | Luerkens | H01M 10/441 |
| 2018/0345806 | A1 * | 12/2018 | Lee | B60L 58/19 |
| 2019/0181653 | A1 * | 6/2019 | Wu | H02J 7/0018 |

FOREIGN PATENT DOCUMENTS

| | | | | |
|---|---|---|---|---|
| DE | 102013204541 A1 * | 9/2014 | | B60L 11/1803 |
| EP | 2862255 A2 | 4/2015 | | |
| JP | 2010130877 A * | 6/2010 | | Y02T 10/72 |
| WO | 2012069907 A1 | 5/2012 | | |
| WO | WO-2018019680 A1 * | 2/2018 | | B60L 3/0046 |

OTHER PUBLICATIONS

International Preliminary Report on Patentability dated Jun. 22, 2020 in corresponding International PCT Application No. PCT/EP2018/068262, 14 pages.

* cited by examiner

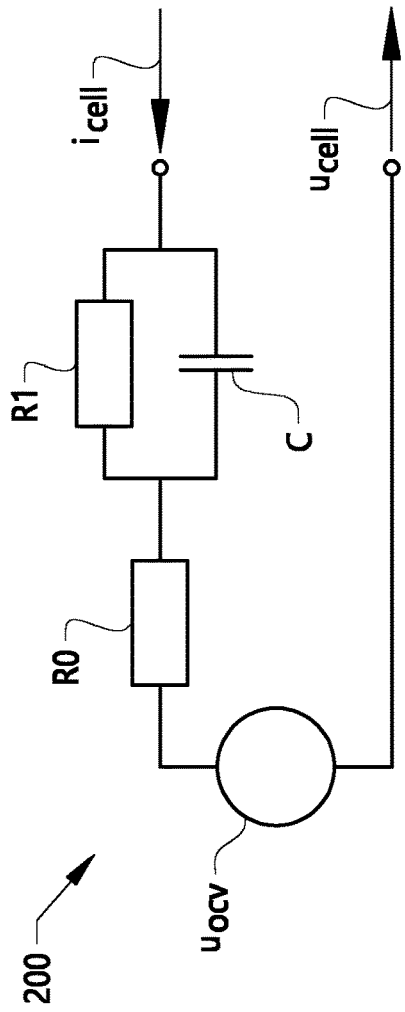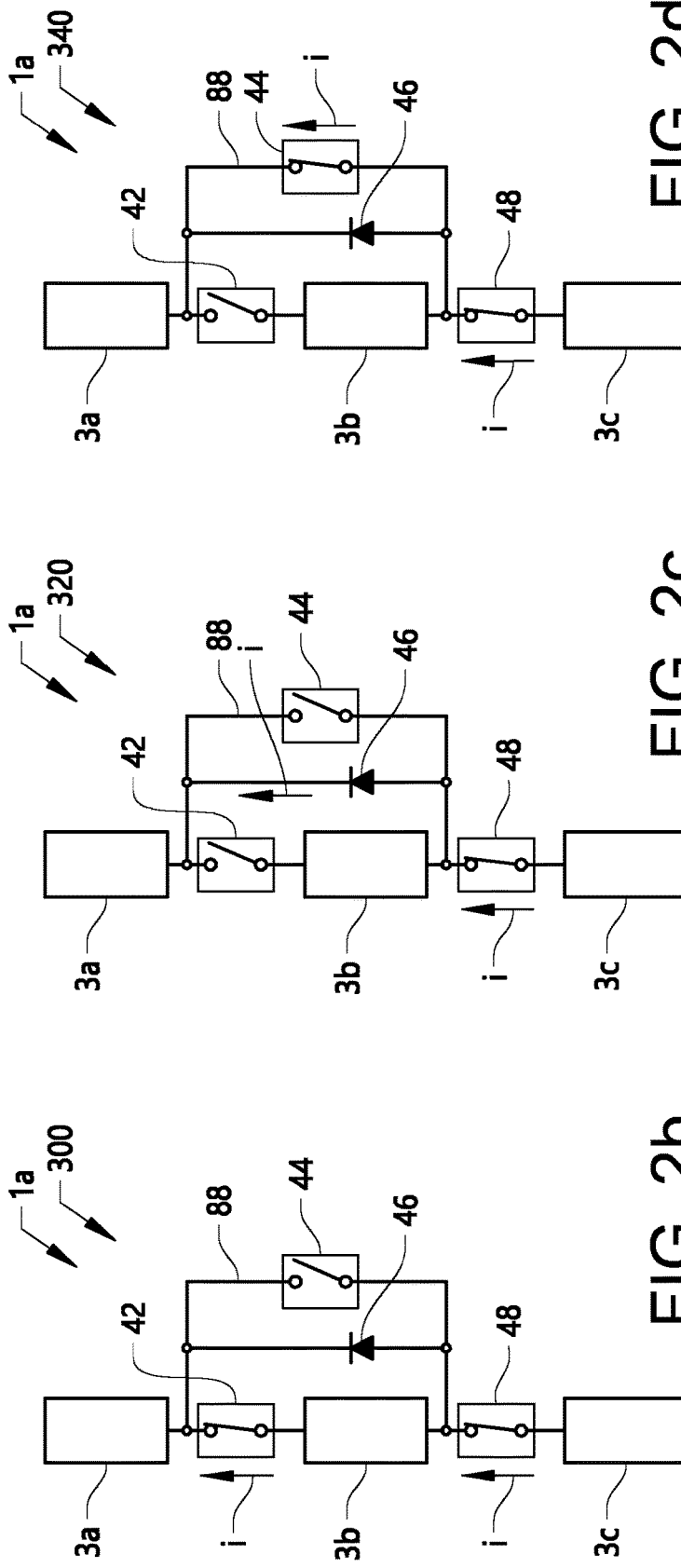

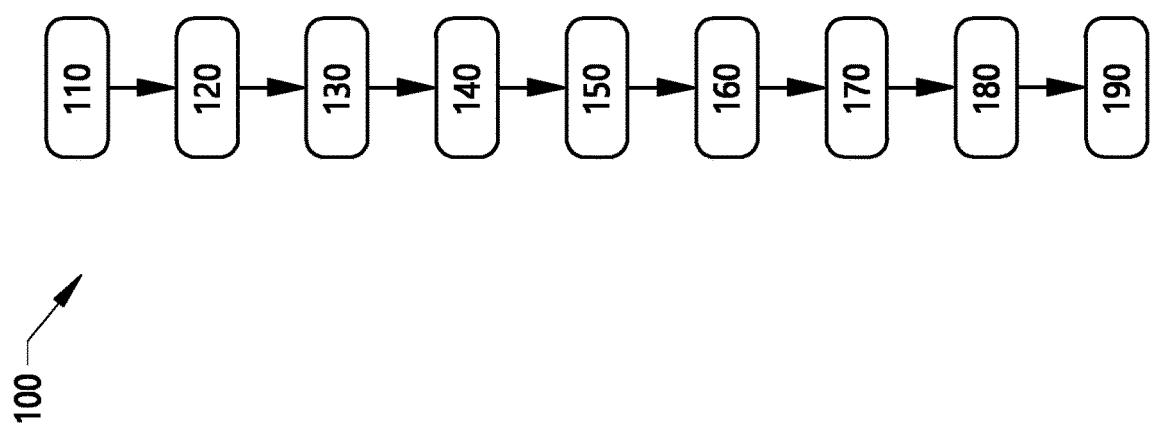

METHOD OF CONTROLLING A BATTERY SYSTEM IN A VEHICLE

CROSS-REFERENCE TO RELATED APPLICATIONS

This application is a U.S. National Stage application of PCT/EP2018/068262, filed Jul. 5, 2018, and published on Jan. 9, 2020, as WO 2020/007474 A1, all of which is hereby incorporated by reference in its entirety.

TECHNICAL FIELD

The invention relates to a method of controlling a battery system in a vehicle. The invention also relates to a battery system comprising a control unit for performing a method of controlling the battery system. Moreover, the invention relates to a vehicle comprising a battery system.

The invention can be applied in any type of hybrid vehicles or electrical vehicles, such as partly or fully electrical vehicles. Although the invention will be described with respect to an electrical bus, the invention is not restricted to this particular vehicle, but may also be used in other hybrid or electrical vehicles such as electrical trucks, electrical construction equipment, and electrical cars. The invention may also be applied in any other type of electrical vehicle such as electrical powered construction equipment, electrical working machines e.g. wheel loaders, articulated haulers, dump trucks, excavators and backhoe loaders etc.

BACKGROUND

Batteries are becoming a more common source of power for providing propulsion for vehicles. Such batteries are often rechargeable batteries and typically include a number of battery stacks having a number of battery cells that may be connected in series or in parallel forming a complete battery system for the vehicle. The quality of the battery system is partly dependent on the quality of each battery cell, thereby setting strict requirements on the production quality of the battery cells. As a consequence, battery systems for partly electric and fully electric vehicles are regarded as critical parts of the vehicle that are made up of rather technically advanced components, thus often being relatively expensive components of the vehicle. At least for this reason, there is an increasing demand for maximizing performance of these battery systems.

However, the battery cells may nevertheless have somewhat different capacities despite the high quality and may also age differently due to e.g. differences in quality and chemistry. Eventually, this will lead to unbalanced battery cells in terms of e.g. state of charge (SOC) and/or available capacity. To this end, the characteristics of the number of battery stacks, and the number of battery cells, in a vehicle often differs relative each other. Moreover, total capacity of the battery system is normally limited by the battery cell(s) having the lowest capacity. With unbalanced battery cells in a battery stack, one can only charge and discharge to the border of the weakest battery cell, typically meaning that one may only use about 60-90% of the battery stack's full potential.

A battery system having a relatively large unbalance between the individual battery cells of battery system the become over discharged and even permanently damaged.

In order to handle unbalances between battery cells in terms of e.g. state of charge (SOC), the battery stacks can undergo balancing in an appropriate manner. By way of example, battery cell balancing can be performed based on resistive balancing, which means that energy is drawn from the most charged cell and dissipated as heat, usually through one or more resistors, i.e. energy is drawn from the cell or the number of cells having highest SOC. Another technology for balancing batteries is DC/DC converting, which uses a DC/DC converter to transfer energy from a battery cell or a number of battery cells with high SOC to battery cell(s) with low SOC.

Further, it is also known that erroneous battery stacks or battery cells can be disconnected from the other battery stacks or battery cells.

Despite the activity in the field, there remains a need for an improved control of a battery system of a vehicle, such as a partly or fully electrical vehicle. In addition, it would be desirable to further improve the overall performance of the battery system during charging and discharging thereof.

SUMMARY

An object of the invention is to provide a method for improving discharging and charging of a battery system of a vehicle. The object is at least partly achieved by a method according to claim 1.

According to a first aspect of the invention, there is provided a method of controlling a battery system in a vehicle during discharging and charging thereof. The battery system comprises a set of battery stacks connected in parallel. Each one of the battery stacks has a set of battery cells connected in series.

The method comprises the steps of determining a state charge level of each battery cell of the set of battery stacks; during discharging of the battery system, identifying a battery cell with a lowest state charge level among the battery cells of the set of battery stacks, or during charging of the battery system, identifying a battery cell with a highest state charge level among the battery cells of the set of battery stacks; temporarily interrupting discharging or charging of the identified battery cell; continuing discharging or charging the remaining battery cells of the set of battery stacks; among the remaining battery cells of the set of battery stacks, sequentially temporarily interrupting discharging or charging a battery cell in each one of the other battery stacks of the set of battery stacks; controlling duration of the step of sequentially temporarily interrupting discharging or charging a battery cell in each one of the other battery stacks of the set of battery stacks based on a battery system characteristic; monitoring state charge levels of the battery cells of the set of battery stacks; comparing the monitored state charge levels of the remaining battery cells of the other battery stacks of set of battery stacks with the state charge level of the identified battery cell of the corresponding battery stack; and resuming discharging or charging of the identified battery cell when state charge levels of the remaining battery cells of the set of battery cells of the set of battery stacks correspond to the state charge level of the identified battery cell.

Accordingly, the method according to the example embodiments provides for discharging and charging a battery system by determining (identifying) the battery cell among all battery cells that has the lowest state charge or highest state charge and thereafter sequentially connecting and disconnecting battery cells in a number of the battery stacks of the battery system. Thereby, charging and discharging can take place in a more efficient and optimal manner, though having battery cells with different state charge levels. Then, when resuming discharging or charging of the identified battery cell, all battery cells of the battery stacks are connected in the battery system. To this end, the method provides for bringing the battery cells of the battery system to relatively common state of charge levels. In other words, the method provides for improving battery cell balancing during discharging and charging in battery system with a greater number of battery cells connected in series. In this context, it is to be noted that a battery system of a hybrid or electric vehicle may comprise about 100 series-connected battery cells or more in order to store and deliver a sufficient level of energy. If one weak battery cell prematurely runs out of charge cycles due to overcharging or excessive discharging, the entire battery stack of series-connected cells may need to be repaired or replaced.

The invention is thus at least partly based on the insight that battery systems having a number of battery stacks connected in parallel, with battery cells connected in series, often have different energy stored internally. That is, when starting to discharge these types of battery stacks, the battery cells in each single battery stack may have different energy stored internally. This means that one or several of the battery cells will reach a low state of charge (SOC) level before the other battery cells. However, by disconnecting one or several of these battery cells according to the example embodiments of the method, and to permit the other ones of the battery cells continue to discharge, while the battery cell/cells with low SOC is/are idle (discharging being temporarily interrupted), it is believed that the battery cells of the battery system can be brought to relatively common state of charge levels in a more efficient manner compared to other methods of balancing battery cells. Likewise for charging, when charging these types of battery stacks, one or several battery cells may reach a full state charge level, e.g. a full SOC level. The method according to the example embodiments then disconnects one or several of these battery cells according to the above steps, thereby permitting the other ones of the battery cells to continue to charge, while the battery cell/cells with a highest SOC is idle.

Accordingly, by the steps of sequentially temporarily interrupting discharging or charging the identified battery cell in a battery stack and subsequently battery cell(s) in each one of the other battery stacks, and controlling duration of the step of sequentially temporarily interrupting discharging or charging of the battery cell in each one of the other battery stacks based on the battery system characteristic, it becomes possible to provide a more balanced and accurate method of discharging and charging the battery system, and thereby utilizing more of the battery system's energy capacity in all cells.

It is to be noted that the example embodiments and the example advantages as mentioned herein are generally applicable both for discharging and charging of the battery system, while it may sometimes be applied only, or partly, during either discharging or charging thereof. Improved discharging and charging of a battery system of a vehicle may also contribute to a more accurate driving range prediction and to a more accurate calculation of a battery's maximum energy storage capability in a vehicle.

The example embodiments of the method are particularly useful during ordinary operation of a vehicle having an electrical propulsion system. By way of example, the method according to the example embodiments can be used as an integrated part of a battery system. Thus, the method can be used on-board (or on-line) of the vehicle and typically during operation of the vehicle.

In this context, it should be readily appreciated that the term "remaining battery cells" typically refers to all battery cells of the battery system except the identified battery cell of the corresponding battery stack. In other words, the remaining battery cells include the other battery cells of the corresponding battery stack, except the identified battery cell, and the battery cells of the other battery stacks.

The step of sequentially temporarily interrupting discharging or charging a battery cell in each one of the other battery stacks of the set of battery stacks provides the exemplary advantage of balancing a discharge rate (during discharging) or a charge rate (during charging) of the set of battery stacks of the battery system. That is, by the step of sequentially temporarily interrupting discharging or charging a battery cell in each one of the other battery stacks of the set of battery stacks, the other battery cells of the corresponding battery stack are maintained connected during discharging or charging, while the other battery cells of the other battery stacks are sequentially disconnected during discharging or charging. In other words, by this step, the other battery cells of the corresponding battery stack, i.e. the battery cells of the corresponding battery stack except the identified battery cell, undergo discharging or charging all the time, while the other battery cells of the other battery stacks sequentially undergo discharging or charging according to a sequence including a period of discharging or charging and a period of interrupted discharging or charging, in which the battery cell(s) are temporarily disconnected from discharging or charging.

It is to be noted that the other battery cells of the corresponding battery stack, as mentioned above, refers to the battery cells of the corresponding battery stack except the identified battery cell of the corresponding battery stack.

Moreover, performing the step of sequentially temporarily interrupting discharging or charging a battery cell in each one of the other battery stacks partly subsequent the step of temporarily interrupting discharging or charging of the identified battery cell having the low SOC, or the high SOC, is partly based on that the step of temporarily interrupting discharging or charging of the identified battery cell having the low SOC, or the high SOC, results in that the other battery cells of that corresponding battery stack are subjected to a lower discharge current compared to the battery cells of the other battery stacks of the battery system. This generally results in that the battery cells of the corresponding battery stack become incompletely discharged, while the other battery cells of the other battery stacks are completely discharged. By sequentially temporarily interrupting discharging or charging battery cell(s) in each one of the other battery stacks in the subsequent step results in an increased load on the corresponding battery stack (with the disconnected identified battery cell having the low SOC or high SOC), thereby decreasing the unbalances in discharging, or charging, between the set of battery stacks of the battery system.

Moreover, sequentially temporarily interrupting discharging or charging a battery cell in each one of the other battery stacks of the set of battery stacks typically follows a predetermined sequence, a lookup table or a runtime computation. By way of example, any one of the predetermined sequence, lookup table or runtime computation are based on data indicative of desired or current SOC levels of the battery cells. One example of a predetermined sequence may be that a first battery cell is disconnected for a first period of time, then the first battery cell is connected to the battery stack followed by that a second battery cell is disconnected by a time period, which may correspond to the first time period, or to another time period different than the first time period. Thereafter, the second battery cell is connected etc.

By way of example, the step of sequentially temporarily interrupting discharging or charging a battery cell in each one of the other battery stacks of the set of battery stacks is performed by simultaneously interrupting discharging or charging of one battery cell in each one of the other battery stacks followed by simultaneously interrupting discharging or charging of another battery cell in each one of the other battery stacks, while the previous interrupted discharging or charging of the one (previous) battery cell of each one of the other battery stacks is resumed.

Alternatively, the step of sequentially temporarily interrupting discharging or charging a battery cell in each one of the other battery stacks of the set of battery stacks is performed by interrupting discharging or charging of one battery cell in one (a first) of the other battery stacks followed by interrupting discharging or charging of one battery cell in another one (a second) of the other battery stacks, while the previous interrupted discharging or charging of the one battery cell of the one (the first) of the other battery stacks is resumed.

The step of sequentially temporarily interrupting discharging or charging a battery cell in each one of the other battery stacks of the set of battery stacks is typically performed in a sequence such that discharging or charging of all battery cells of each one of the other battery stacks have been temporarily interrupted at lease once before the step restart with an additional loop of temporarily interrupting discharging or charging all battery cells of the each one of the battery stacks of the other battery stacks of the set of battery stacks.

According to one example embodiment, the step of temporarily interrupting discharging or charging of the identified battery cell is performed by disconnecting the identified battery cell in the corresponding battery stack. In this manner, it is estimated that no current is fed through the disconnected identified battery cell during discharging or charging of the battery system. By way of example, the identified battery cell is disconnected from the corresponding battery stack by bypassing disconnecting the identified battery cell during charging or discharging. The bypassing disconnection of the identified battery cell can be provided by a switch unit arrangement arranged in connection with each one of the battery cells. The disconnected identified battery cell is connected again by controlling the switch unit arrangement.

According to one example embodiment, the step of sequentially temporarily interrupting a battery cell in each one of the other battery stacks of the set of battery stacks is performed by sequentially disconnecting a battery cell in each one of the other battery stacks of the set of battery stacks. In this manner, it is estimated that no current is fed through the disconnected battery cell during discharging or charging of the battery system. By way of example, the battery cell is disconnected from the other battery stack by bypassing disconnecting the battery cell during charging or discharging. The bypassing disconnection of the battery cell can be provided by a switch unit arrangement arranged in connection with the battery cell. The disconnected battery cell is connected again by controlling the switch unit arrangement. In other words, resuming discharging or charging of the battery cell is performed by connecting the battery cell to the other battery cells of the given battery stack.

According to one example embodiment, the step of resuming discharging or charging of the identified battery cell is performed by connecting the identified battery cell to the other battery cells of the corresponding battery stack.

According to one example embodiment, the step of sequentially temporarily interrupting discharging or charging comprises sequentially temporarily interrupting discharging or charging all battery cells of a battery stack of the other battery stacks of the set of battery stacks. In this manner, the method is configured to sequentially temporarily interrupting discharging or charging an entire battery stack of the battery system.

According to one example embodiment, the step of identifying a battery cell with a low state charge level during discharging of the battery system or a battery cell with a high state charge level during charging of the battery system is performed by comparing the state charge level of a battery cell with a threshold value. A low state charge level for a lithium-ion battery cell may e.g. amounts to a state of charge level of about 5 percent. However, in some examples, a low state charge level for a lithium-ion battery cell may sometimes amounts to a state of charge level of about 10 percent, while in other examples, a low state charge level for a lithium-ion battery cell may sometimes amounts to a state of charge level of about 15 percent. For other types of battery cell, however, a low state charge level may amounts to a state of charge level of about 50 percent. Accordingly, the threshold value may e.g. correspond to a SOC level of about 50%, preferably the threshold value may correspond to a SOC level of about 15%, still preferably the threshold value may correspond to a SOC level of about 10%, still preferably the threshold value may correspond to a SOC level of about 5%.

A high state charge level for a battery cell may typically amounts to a state of charge level of about 100 percent. Accordingly, the threshold value may e.g. correspond to a SOC level of about 100%.

As mentioned above, the step of controlling duration of the step of sequentially temporarily interrupting discharging or charging a battery cell in each one of the other battery stacks of the set of battery stacks is based on a battery system characteristic.

By way of example, the battery system characteristic comprises data indicative of the current through each one of the battery stacks of the battery system and the power output of the battery system. In this context of the battery system characteristic, it is to be noted that the current through each one of the battery stacks of the battery system is determined during the step of temporarily interrupting discharging or charging a battery cell in each one of the other battery stacks of the set of battery stacks, and the power output of the battery system is determined during the step of during temporarily interrupting discharging or charging a battery cell in each one of the other battery stacks of the set of battery stacks.

By controlling the step of sequentially temporarily interrupting discharging or charging a battery cell in each one of the other battery stacks of the set of battery stacks based on the above battery system characteristics, while charging and discharging of the identified battery cell is remained interrupted, it becomes possible to provide a relatively even distribution of discharge or charge from the battery stacks of the battery system. That is, the discharge rate or charge rate of the battery stack with the identified battery cell of low state charge or high state charge is balanced relative the discharge rate or charge rate of the other battery stacks of the battery system.

In addition, the battery system characteristic may comprise data indicative of the number of battery cells of the battery system and the internal resistance of the battery cells of the battery systems during discharging or charging.

According to one example embodiment, the current through a battery stack of the battery system is determined during the step of temporarily interrupting discharging or charging a battery cell in each one of the other battery stacks of the set of battery stacks. Typically, the current through a battery stack of the battery system is determined during the step of temporarily interrupting discharging or charging a battery cell in each one of the other battery stacks of the set of battery stacks according to:

$$Istack_j = \frac{\left(\sum_1^{k-1} V\,cell_k\right) - V\,out_{tot}}{\sum_1^{k-1} R\,cell_k}$$

wherein $Istack_j$ is current through a battery stack j with one disconnected battery cell, e.g. current through the battery stack during the step of temporarily interrupting discharging or charging a battery cell in each one of the other battery stacks of the set of battery stacks, $Vcell_k$ is internal output voltage from a battery cell k of the battery stack j with one disconnected battery cell, e.g. during the step of temporarily interrupting discharging or charging a battery cell in each one of the other battery stacks of the set of battery stacks, $Vout_{tot}$ is output voltage from the battery stack j with one disconnected battery cell, e.g. during the step of temporarily interrupting discharging or charging a battery cell in each one of the other battery stacks of the set of battery stacks, and $Rcell_k$ is internal resistance of the battery cell k.

In other words, the current through a battery stack of the battery system, as mentioned above refers, to the current through a battery stack when one battery cell is disconnected. Thus, the above relationship of determining current through a battery stack with one battery cell disconnected is also applicable for determining current through the corresponding battery stack with the identified battery cell disconnected.

According to one example embodiment, the power output of the battery system is determined during the step of temporarily interrupting discharging or charging a battery cell in each one of the other battery stacks of the set of battery stacks. Typically, the power output of the battery system is determined during the step of temporarily interrupting discharging or charging a battery cell in each one of the other battery stacks of the set of battery stacks according to:

$$Wtot_S = V\,out_{totS} * \left(\left(\sum_1^{n-1} Istack_i\right) + Istack_j\right)$$

wherein $Wtot_s$ is total power output of the battery system during the step of temporarily interrupting discharging or charging a battery cell in each one of the other battery stacks of the set of battery stacks, $Vout_{totS}$ is total output voltage from the battery system during the step of temporarily interrupting discharging or charging a battery cell in each one of the other battery stacks of the set of battery stacks, $Istack_i$ is current through a battery stack I with all battery cells connected, and $Istack_j$ is current through the battery stack (j) during the step of temporarily interrupting discharging or charging a battery cell in each one of the other battery stacks of the set of battery stacks.

According to one example embodiment, the step of determining a state charge of the set of battery cells in the set of the battery stacks comprises the step of monitoring a state charge level of the set of battery cells in the set of the battery stacks by means of a sensor unit arranged in connection with set of battery cells.

Typically, the step of monitoring state charge levels of the battery cells of the set of battery stacks is performed on all battery cells of the set of battery stacks, including the identified battery cell of the corresponding battery stack. By way of example, the state charge level refers to the SOC of the battery cells. The SOC of a battery cell is generally estimated and determined using coulomb counting in combination with periodical calibration. The SOC of a battery cell may also be estimated and determined based on battery system open circuit voltage (OCV). Determining battery cell SOC by OCV is commonly known in the art, and is typically performed by measuring OCV of the battery cell. The OCV of a cell is determined by measuring the terminal voltage output of the battery cell when the cell is disconnected from any external load and no external electric current flows through the cell. The OCV is in direct correlation with the SOC of the battery cell.

According to one example embodiment, the monitored state charge levels of the battery cells of the set of battery stacks are stored in a control unit, e.g. in a storage component of the control unit. Thus, the method may further include the step of storing the monitored state charge levels of the battery cells of the set of battery stacks.

By way of example, the term "state charge level", as used herein, typically refers to the state of charge level of a battery cell, although it may in some occasions also refer to the state of charge level of a battery stack or the entire battery system. In the context of the example embodiments of the invention, the term "state of charge (SOC)", as used herein, refers to the available capacity at the present status of the battery system. The SOC may also include or represent the charge level of a battery cell, a single battery unit, a single battery stack, the electrical energy storage system or a combination thereof. The SOC is typically determined in percentage (%) between available capacity and rated capacity of a new battery cell or current capacity or a battery cell, where 0 percent corresponds to the electrochemical cell or the electrical storage system containing no charge at all and 100 percent corresponds to a cell or ESS being completely full of charge. If present and maximal charge levels of the battery are known, the SOC may be determined based on the relationship:

$$SOC = \frac{Q_*}{Q_{batt}} \times 100 \quad \text{(Eq. 12)}$$

wherein

SOC is the level of charge at the present moment of the battery pack assembly;

$Q^*$ is the estimated remaining capacity of the battery pack assembly; and $Q_{batt}$ is the rated nominal capacity at the present age of the calculation.

In hybrid and electric vehicles comprising a battery system, the SOC has several different purposes, e.g. it may be used as an input to other battery management functions, including but not limited to SOP, SOQ, SOR, SOE, in overall vehicle energy management, in a charging strategy, as input to an life time estimator, as input to an ageing time estimator and as input when analysing fault cases or a combination thereof.

As mentioned above, the battery system has a multiple number of individual battery stacks connected in parallel to form the system. A battery stack may be a battery cell string comprising a number of serially interconnected single battery cells. That is, the battery cells are connected in series in the battery cell string, while the battery cell strings are connected in parallel in the battery system. By way of example, any one of the battery cells in the battery system is any one of a lithium-ion battery or sodium-ion battery. A sodium-ion battery typically includes any type of sodium iron battery or sodium ferrite battery. It is to be noted, however, that the battery system can include different types of batteries. The battery system may comprise about 100 series-connected electrochemical cells, and preferably at least 150 series-connected cells, for example lithium cells. Typically, the output voltage of the battery system equals the accumulated output voltage of each cell of a common battery stack or battery string. A battery system may of course comprise two or more parallel-connected battery stacks of series-connected battery cells, where each stack comprises about 100-200 cells, for the purpose of increasing the total electrical capacity of the electrical storage system. The number of battery stacks of a battery system may vary. By way of example, the number of battery stacks is about 2-20, preferably about 4-15, more preferably about 5-10. In one example, the number of battery stacks of the battery system is seven. Also, it is to be noted that the battery system is generally a so called high voltage battery system. In this context, the term "high voltage" refers to a battery system of about 400-1000 voltage (V).

Generally, the term "electrical propulsion system", as used herein, typically refers to vehicle electrical components for providing energy (such as traction energy) and for storing energy (delivering and receiving energy). The electrical propulsion system is in particular configured to deliver and receive energy for providing propulsion to the vehicle, but also for performing various vehicle operations of the vehicle. One component of the electrical propulsion system is the battery system.

The method according to the example embodiments can be executed in several different manners. Thus, the example embodiments of the method and any one of the sequences/steps of the methods are executed by the control unit. Thus, according to one example embodiment, the steps of the method are performed by the control unit during ordinary use of the battery system, the electrical propulsion system and/or the vehicle. Typically, the control unit is configured to control discharging and charging of the battery system. The method may be continuously running as long as the vehicle is operative, but also continuously running when the vehicle is in a non-operative state while the battery unit is used, e.g. during a charging operation. Accordingly, the phrase "during use of the battery system" may refer to the state of charging of the battery system, and to the state of using (discharging) the battery system during operation of the vehicle, e.g. driving of the vehicle.

The sequences of the method may likewise be performed by other types of components and by other technologies as long as the method can provide the associated functions and effects. Moreover, the method can likewise be implemented for controlling a model of the battery system, the model comprising an equivalent circuit of the battery system. A common type of a battery model comprises an equivalent circuit model through which current-voltage characteristics may be obtained for the model battery system.

As mentioned above, the method is applicable both for discharging of battery cells of the battery system and for charging of the battery cells of the battery system. Thus, in one example embodiment, when the battery system is set to operate in a discharging mode, the method comprises the step of determining a state charge level of each battery cell of the set of battery stacks is typically performed; during discharging of the battery system, identifying a battery cell with a lowest state charge level among the battery cells of the set of battery stacks; temporarily interrupting discharging the identified battery cell; continuing discharging the remaining battery cells of the set of battery stacks; among the remaining battery cells of the set of battery stacks, sequentially temporarily interrupting discharging a battery cell in each one of the other battery stacks of the set of battery stacks; controlling duration of the step of sequentially temporarily interrupting discharging a battery cell in each one of the other battery stacks of the set of battery stacks based on a battery system characteristic; monitoring state charge levels of the battery cells of the set of battery stacks; comparing the monitored state charge levels of the remaining battery cells of the other battery stacks of set of battery stacks with the state charge level of the identified battery cell of the corresponding battery stack; and resuming discharging the identified battery cell when state charge levels of the remaining battery cells of the set of battery cells of the set of battery stacks corresponds to the state charge level of the identified battery cell.

Alternatively, when the battery system is set to operate in a charging mode, the method comprises the step of determining a state charge level of each battery cell of the set of battery stacks is typically performed; during charging of the battery system, identifying a battery cell with a lowest state charge level among the battery cells of the set of battery stacks; temporarily interrupting charging the identified battery cell; continuing charging the remaining battery cells of the set of battery stacks; among the remaining battery cells of the set of battery stacks, sequentially temporarily interrupting charging a battery cell in each one of the other battery stacks of the set of battery stacks; controlling duration of the step of sequentially temporarily interrupting charging a battery cell in each one of the other battery stacks of the set of battery stacks based on a battery system characteristic; monitoring state charge levels of the battery cells of the set of battery stacks; comparing the monitored state charge levels of the remaining battery cells of the other battery stacks of set of battery stacks with the state charge level of the identified battery cell of the corresponding battery stack; and resuming charging the identified battery cell when state charge levels of the remaining battery cells of the set of battery cells of the set of battery stacks corresponds to the state charge level of the identified battery cell.

According to a second aspect of the present invention, there is provided a computer program comprising program code means for performing the steps of any one of the example embodiments of the first aspect when the program is run on a computer. Effects and features of the second aspect of the invention are largely analogous to those described above in connection with the first aspect.

According to a third aspect of the present invention, there is provided a computer readable medium carrying a computer program comprising program code means for performing the steps of any of the embodiments of the first aspect when the program product is run on a computer. Effects and features of the third aspect of the invention are largely analogous to those described above in connection with the first aspect.

According to a fourth aspect of the present invention, there is provided a battery system for a vehicle. The battery system comprises a set of battery stacks connected in parallel, each one of the battery stacks having a set of battery cells connected in series, and a battery control unit. The battery control unit is configured to determine a state charge level of each battery cell of the set of battery stacks; during discharging of the battery system, identify a battery cell with a lowest state charge level among the battery cells of the set of battery stacks, or during charging of the battery system, identify a battery cell with a highest state charge level among the battery cells of the set of battery stacks; temporarily interrupt discharging or charging of the identified battery cell; continue discharging or charging the remaining battery cells of the set of battery stacks; among the remaining battery cells of the set of battery stacks, sequentially temporarily interrupt discharging or charging a battery cell in each one of the other battery stacks of the set of battery stacks; control duration of the sequentially temporarily interrupted discharging or charging a battery cell in each one of the other battery stacks of the set of battery stacks based on a battery system characteristics; monitor state charge levels of the battery cells of the set of battery stacks; compare the monitored state charge levels of the remaining battery cells of the other battery stacks of set of battery stacks with the state charge level of the identified battery cell of the corresponding battery stack; and resume discharging or charging of the identified battery cell when state charge levels of the remaining battery cells of the set of battery cells of the set of battery stacks corresponds to the state charge level of the identified battery cell.

Effects and features of the fourth aspect of the invention are largely analogous to those described above in connection with the first aspect. The battery system can be incorporated and installed in a partly or fully electrical vehicle.

In addition, there is also provided an electrical propulsion system for a vehicle. The electrical propulsion system comprises an electrical motor for providing power to the vehicle and a battery system according to the fourth aspect above. The battery system is connected to the electrical motor to provide power to the electrical motor. The electrical propulsion system can be incorporated and installed in a partly or fully electrical vehicle. The electrical motor can be provided in several different manners. According to one example embodiment, the electrical motor is any one of a permanent magnet synchronous machine, a brushless DC machine, an asynchronous machine, an electrically magnetized synchronous machine, a synchronous reluctance machine or a switched reluctance machine. Typically, the electrical motor is configured for driving at least a ground engaging member. Typically, the electric motor is configured for driving a pair of ground engaging members. By way of example, the ground engaging member is a wheel, a track or the like. The electrical motor can be coupled to the ground engaging members in several different manners. In one example embodiment, the electrical motor is coupled to a pair of ground engaging members by means of a transmission and a clutch. The transmission typically comprises a number of gears including a neutral gear.

The control unit may include a microprocessor, microcontroller, programmable digital signal processor or another programmable device. Thus, the control unit comprises electronic circuits and connections as well as processing circuitry such that the control unit can communicate with different parts of the electrical propulsion system such as the electrical machines and the battery system. Typically, the control unit may also be configured to communicated with other parts of the vehicle such as the brakes, suspension, the clutch, transmission and further electrical auxiliary devices, e.g. the air conditioning system, in order to at least partly operate the bus. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions.

In other words, the control functionality of the example embodiments of the battery system may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the battery system described above includes a control unit being an integral part thereof, it is also possible that the control unit may be a separate part of the vehicle, and/or arranged remote from the battery system and in communication with the battery system.

The control unit may also include a model of one battery system. Thus, the battery system typically includes the control unit configured to control the functionality of the battery unit assembly. In other words, the battery system is typically a part of the vehicle propulsion system. The battery system may also include a so called battery management unit which can be an integral part of the control unit or a separate part of the system but in communication with the control unit.

The control unit is generally configured to control and monitor the battery battery. Typically, although strictly not required, the control unit includes the battery management unit configured to monitor battery cell characteristics such as state of charge (SOC) and open circuit voltage of the battery cells. Other functions of the battery management unit may relate to safety functions, such as state-of-power, and/or closing the contactors.

According to a fifth aspect of the present invention, there is provided a vehicle, such as a fully or hybrid electrical vehicle, comprising a battery system according to any one of the example embodiment mentioned above. Effects and features of the fifth aspect of the invention are largely analogous to those described above in connection with the first aspect. The vehicle may be an electrical, hybrid, or plug-in hybrid vehicle comprising an electrical motor, wherein the battery unit assembly provides power to the electrical motor for providing propulsion for the vehicle. It is to be noted that the vehicle can therefore be either a partly of fully electrical vehicle.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 2a schematically illustrates parts of a cell model describing a battery cell according to example embodiments of the invention;

FIGS. 2b to 2d schematically illustrate an overview of a number of states of a battery stack of the battery system in FIG. 1, in which the battery stack comprising a set of battery cells controllable according to an example embodiment of the invention during discharging and charging thereof;

FIG. 3 is a flow-chart of a method according to an example embodiment of the invention, in which the method comprises a number of steps for controlling the battery system in FIG. 1;

Figure 1:
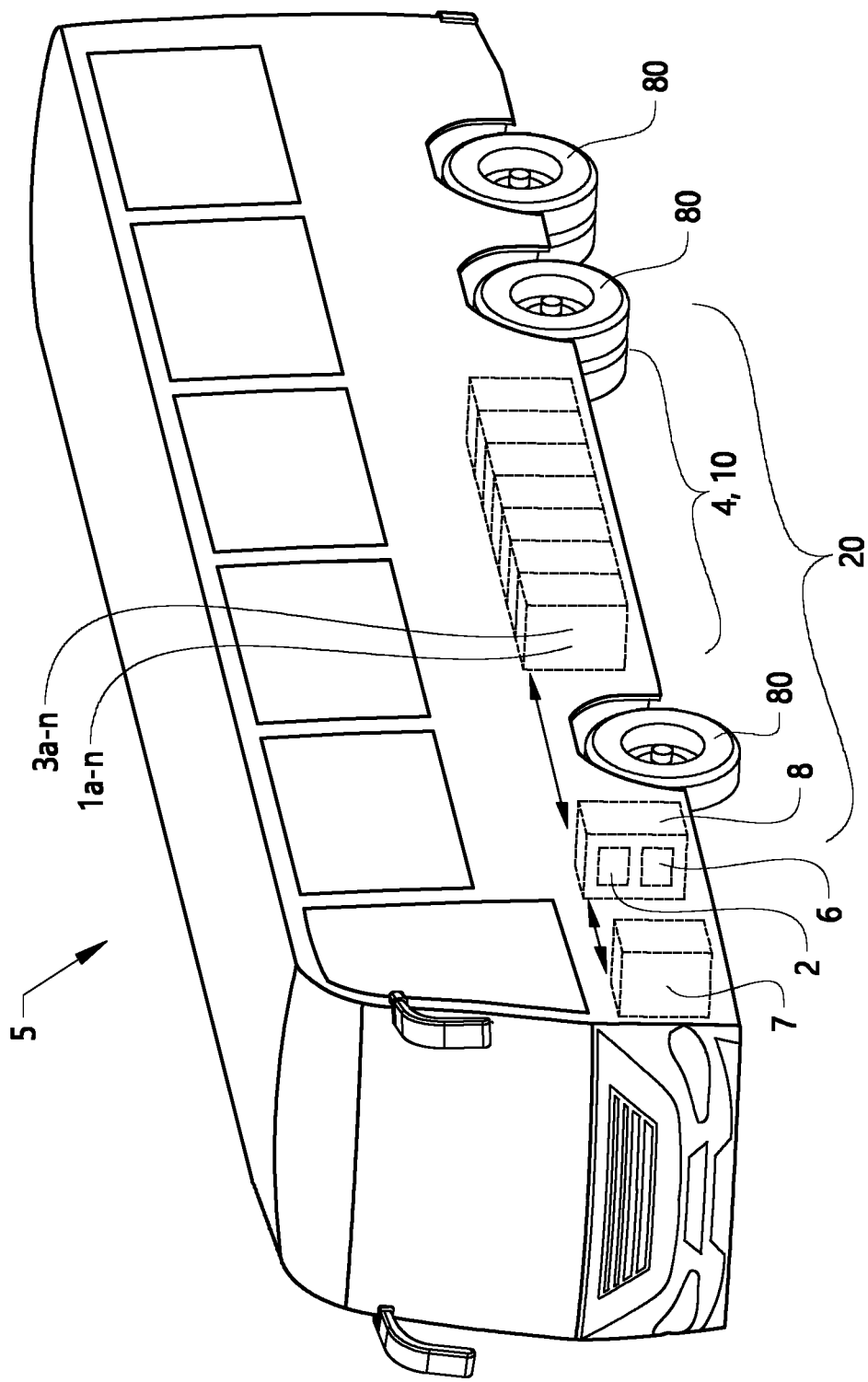
FIG. 1 is a side view of vehicle in the form an electrical bus according to example embodiments of the invention, the vehicle comprising an electric propulsion system having a battery system.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of an electrical bus 5. The electrical bus is here a fully electrical vehicle, which is typically entirely powered by an electrical energy storage system such as a battery system. The electrical bus 5 comprises an electrical propulsion system 20 configured to provide traction power to the vehicle. The electrical propulsion system 20 provides electrical power to an electrical motor. However, the electrical propulsion system can also be adapted to manage various electronic functions of the vehicle. The electrical propulsion system comprises the electrical energy storage system 10 and the electrical motor 7. The electrical energy storage system 10 is connected to the electrical motor to provide power to the electrical motor, thereby the electrical motor can provide traction power to one or more ground engaging members, e.g. one or more wheels 80. The electrical energy storage system is a DC electrical energy storage system such as the battery system comprising a number of battery stacks.

The electrical energy storage system 10 here comprises the battery system 4. The battery system typically includes a plurality of battery stacks $1_a$ to $1_n$. By way of example, each one of the battery packs is a lithium-ion battery. Moreover, each one of the battery stacks comprises a number of battery cells. In this context, the battery stack is a battery comprising a plurality of battery cells 3. As such, each one of the battery stacks $1_a$ to $1_n$ comprises a plurality of battery cells $3_a$ to $3_n$. As illustrated in FIG. 1, the battery system comprises seven battery packs. The battery system 4 thus includes seven number of battery stacks $1_a$-$1_g$, each one of them comprising a number of battery cells $3_a$ to $3_g$. The battery system may comprise 50-500 battery cells. The number of battery stacks in the battery system and the number of battery cells varies depending on type of vehicle and type of installation, etc.

Accordingly, the battery system 4 is arranged to provide electrical power to the electrical motor 7 arranged for providing propulsion for the electrical bus 5. Typically, the electrical bus 5 further comprises a control unit 8 configured to control and monitor the battery system 4. The control unit is here an electronic control unit. The electrical propulsion system 20 here comprises the control unit 8 including a battery management unit 2 and the battery system 4. Typically, although strictly not required, the control unit 8 has a battery management unit 2 configured to monitor battery cell characteristics such as state of charge (SOC) and open circuit voltage of the battery cells 3. The control unit is further provided with a storage component 6 adapted to store a battery equivalent model as will be further discussed in relation to FIG. 2a and data for performing the method according to example embodiments described below.

The control unit 8 may include a microprocessor, microcontroller, programmable digital signal processor or another programmable device. Thus, the control unit comprises electronic circuits and connections (not shown) as well as processing circuitry (not shown) such that the control unit can communicate with the battery system. The control unit can typically also communicate with different parts of the vehicle such as the brakes, suspension, driveline, in particular the electrical motor, a clutch, and a gearbox in order to at least partly operate the bus 5. While the example embodiment described above includes a control unit being an integral part of the system 20, it is also possible that the control unit may be a separate part of the system 20 or the like.

Turning now to FIG. 2a, there is depicted a cell model comprising an equivalent circuit of a battery cell. The exemplary equivalent circuit model 200 comprises a single RC circuit to model the battery cell. The exemplary RC based equivalent circuit model is used for determining a state charge level of a battery cell, such as the state of charge (SOC) level of the battery cell 3a, and is typically implemented by the above mentioned control unit so as to handle deviations between model and real world voltage responses to current. The characterization of the battery cell may be calculated by real-time parameter estimation approaches on battery models using direct battery measurements. The battery cell charge state estimation may for example be based on measured battery current inputs and a battery terminal voltage.

The equivalent circuit model described in relation to FIG. 2a consists of an active electrolyte resistance (or internal resistance) R0, in series with the parallel capacitance C, and a polarization resistance (or internal resistance) R1. $u_{cell}$ refers to battery cell terminal voltage output, $i_{cell}$ refers to the current in the circuit and $u_{OCV}$ refers to the battery open circuit voltage. For given values of the terms $u_{OCV}$, R0, R1 and C, the terminal voltage $u_{cell}$ can be expressed as a function of the current $i_{cell}$. Normally R0 and R1 increases by age, while battery cell capacity (not illustrated in the figure) decreases by age.

By the equivalent circuit model of the battery cell 3a, it becomes possible to determine a state charge level of a battery cell. As such, it is possible to monitor the state charge level of a battery cell of the battery system. Typically, the SOC of a battery cell is estimated and determined based on the battery system open circuit voltage (OCV), which in FIG. 2a is indicated with $u_{OCV}$. Determining battery cell SOC by OCV is commonly known in the art, and is typically performed by measuring the OCV of the battery cell. The OCV of a battery cell is determined by measuring the terminal voltage output $u_{cell}$ of the battery cell when the cell is disconnected from any external load and no external electric current flows through the cell, and any internal capacitor has discharged. The OCV is in direct correlation with the SOC of the battery cell, thus the method above is suitable for measuring and determining the SOC of the battery cell and the battery system.

One example embodiment of a method according to the invention will now be described in more detail by referring to FIGS. 2b-2d and FIG. 3. In FIGS. 2b-2d, there is depicted an overview of a number of states of a battery stack of the battery system in FIG. 1. FIGS. 2b-2d describes various states of the battery stack during discharging of the battery system. In addition, as will be further described below, FIGS. 2b-2d schematically illustrate one example of a switch unit assembly arrangement for temporarily interrupting discharging of a battery cell. In particular, FIGS. 2b-2d illustrates one example of temporarily interrupting discharging of a battery cell by disconnecting the battery cell 3b in the corresponding battery stack 1a.

It should be noted that while the battery stack typically comprises a large number of battery cells, only three battery cells of the battery stack are illustrated in FIGS. 2b-2d for the sake of describing one example of the method. In FIG. 3, there is depicted a flowchart of the steps of a method according to an example embodiment. In particular, there is depicted a method 100 of controlling a battery system in a vehicle during discharging or charging thereof. The method can be used for controlling the battery system of the vehicle electrical propulsion system 20 as described above in relation to FIG. 1. The sequences of the method are typically performed by the control unit 8, such as an electronic control unit, as described above in relation to the FIG. 1.

Turning again to FIGS. 2b-2d, the battery system is here illustrated by the battery stack 1a having a number of battery cells 3a, 3b and 3c. The flow of current i is directed from the third battery cell 3c to the first battery cell 3a, as indicated by the arrows in the FIGS. 2b-2d. In addition, the battery system comprises a switch unit arrangement having a first switch 42, a second switch 44 and a third switch 48. The first switch 42 is arranged between the battery cell 3b and the battery cell 3a. The third switch 48 is arranged between the third battery cell 3c and the second battery cell 3b. In addition, the second switch 44 is arranged in a by-pass line 88 of the second battery cell 3b. Accordingly, in this example, there is provided a battery cell by-pass arrangement for bypassing the second battery cell 3b. The by-pass arrangement thus comprises the switches 42, 44 and 46. Moreover, the by-pass arrangement comprises an internal diode. In other words, in this example, the battery system comprises an internal diode 46. The internal diode is used during switching to avoid interruption in the flow of current. One example of a commonly known switch for the by-pass arrangement is a MOSFET transistor. In FIG. 2b-2d, each switch 42, 44 and 46 is a MOSFET switch. A MOSFET transistor has an internal diode that can be used during switching. The transistor is controlled by logic typically connected to a charge pump (not shown) to provide the desired voltage. The voltage over each battery cell is read by the same logic via for example an AD converter interface.

As can be seen in FIG. 2b, the battery stack is in a state 300, in which the battery cells 3a, 3b and 3c are connected in series. In this state, the first switch 42 and the third switch 48 are closed to permit a flow of current through all battery cells 3a, 3b, 3c etc., while the second switch 44 is open.

Assuming now that the battery cell 3b has a low SOC compared to the other battery cells. In another state 320, as illustrated in FIG. 2c, the first switch 42 is open between the battery cell 3a and the battery cell 3b, and current starts flowing through the diode 46 instead. In this state, as depicted in FIG. 2c, the second switch 44 is still open.

However, in a further state 340, as illustrated in FIG. 2d, the second switch 44 is closed, while the first switch 42 remains open. In this manner, the current starts flowing through the second switch 44 instead. In this state 340, depicted in FIG. 2d, the second battery cell 3b is disconnected and does not discharge. Accordingly, the second battery cell is by-passed when discharging the battery cells of the battery stack. In this manner, discharging of the second battery cell 3b is temporarily interrupted by disconnecting the battery cell 3b in the corresponding battery stack 1a.

When the other battery cells, exemplified by battery cell 3a and battery cell 3c, have reached the same SOC as the second battery cell 3b, the second battery cell 3b is reconnected in the battery stack permitting the second battery cell to continue discharge. The second battery cell is typically connected by firstly opening the second switch 44 and then closing the first switch 42, corresponding to the state 300 in FIG. 2b. In other words, discharging of the battery cell 3b is resumed when state charge levels of the other battery cells of the set of battery cells of the battery stack corresponds to the state charge level of the battery cell 3b.

Further, the switch unit arrangement described in relation to the FIGS. 2b-2d are also applicable for disconnecting a battery cell in each one of the set of battery stacks as described herein. Thus, the switch unit arrangement described in relation to the FIGS. 2b-2d, is typically also used for sequentially temporarily interrupting discharging or charging a battery cell $3_a$ to $3_n$ in each one of the other battery stacks $1_b$ to $1_n$ of the set of battery stacks $1_a$ to $1_n$. The switch units of the battery system are here controlled by the control unit.

Accordingly, when the other battery cells $3_a$ to $3_n$ of the other battery stacks $1_b$ to $1_n$ have reached the same SOC as the second battery cell $3_b$ of the above first (i.e. the corresponding) battery stack $1_a$, the second battery cell $3_b$ of the first (i.e. the corresponding) battery stack $1_a$ is reconnected in the battery stack $1_a$ permitting the second battery cell $3_b$ of the first (i.e. the corresponding) battery stack $1_a$ to continue discharge. The second battery cell $3_b$ is typically connected by firstly opening the second switch 44 and then closing the first switch 42, corresponding to the state 300 in FIG. 2*b*. In other words, discharging of the battery cell $3_b$ of the first (i.e. the corresponding) battery stack $1_a$ is resumed when state charge levels of the other battery cells $3_a$ to $3_n$ of the other battery stacks $1_b$ to $1_n$ corresponds to the state charge level of the battery cell $3_b$ of the first (i.e. the corresponding) battery stack $1_a$.

It should be noted that although the FIGS. 2*b*-2*d* illustrate one example of temporarily interrupting discharging of the battery cell by disconnecting the battery cell in the corresponding battery stack, the example may likewise be used for temporarily interrupting charging of the battery cell by disconnecting the battery cell in the corresponding battery stack.

Hence, at the top level of the battery system, there is several single battery stacks connected in parallel. This means that if one disconnects one battery cell in one of the single battery stacks due to that battery cell has low SOC, that battery stack would have had a lower total voltage if it had been disconnected from the other battery stacks. But as it is connected in parallel with other battery stacks, it will be forced to a higher total voltage. Accordingly, this means that this single battery stack will provide less current to the total energy output from the battery system. This is due to the internal resistances in each battery cell that lowers the output voltage due to provided current. Assuming that if a single battery cell has an internal resistance of $R_{cell}$, typically corresponding to the sum of R0 and R1, as mentioned above, then the voltage output of that battery cell is defined according to:

$$Vout_k = Vcell_k - Rcell_k * Istack_i \quad (Eq.\ 1)$$

wherein
$Vout_k$ is battery cell external output voltage
$Vcell_k$ is battery cell internal output voltage
$Rcell_k$ is battery cell internal resistance
$Istack_i$ is current through the battery cell This means that the output voltage of a single battery stack, $Vout_i$, is defined according to:

$$Vout_i = \Sigma_1^k (Vcell_k - Rcell_k * Istack_i) \quad (Eq.\ 2)$$

Then, for n parallel connected battery stacks, the output voltage is defined according to:

$$Vout_1 = Vout_2 = \ldots = Vout_n = Vout_{tot} \quad (Eq.\ 3)$$

And therefore for any battery stack i:

$$Vout_{tot} = \Sigma_1^k (Vcell_k - Rcell_k * Istack_i) \quad (Eq.\ 4)$$

Then, the current from a battery stack number i is defined according to:

$$Istack_i = \frac{\left(\sum_1^{k-1} V\,cell_k\right) - Vo_{tot}}{\sum_1^k R\,cell_k} \quad (Eq.\ 5)$$

And the battery power output for a battery system M is defined according to:

$$Wtot_M = Vout_{totM} * \Sigma_1^n Istack_i \quad (Eq.\ 6)$$

Then, the current for a battery stack j with one less battery cell is defined according to:

$$Istack_j = \frac{\left(\sum_1^{k-1} V\,cell_k\right) - V\,out_{tot}}{\sum_1^{k-1} R\,cell_k} \quad (Eq.\ 7)$$

wherein
$Istack_j$ is current through a battery stack j with one less battery cell,
$Vcell_k$ is output voltage from a battery cell k of the battery stack j with one less battery cell,
$Vout_{tot}$ is output voltage from the battery stack j with one less battery cell, and
$Rcell_k$ is internal resistance of the battery cell k.

Moreover, a power output for a battery system S with one battery cell disconnected is defined according to:

$$Wtot_S = Vout_{totS} * ((\Sigma_1^{n-1} Istack_i) + Istack_j) \quad (Eq.\ 8)$$

wherein
$Wtot_s$ is total power output of the battery system with one battery cell disconnected,
$Vout_{totS}$ is total output voltage from the battery system with one battery cell disconnected,
$Istack_i$ is current through a battery stack with all battery cells connected, and
$Istack_j$ is current through the battery stack (j) with one battery cell disconnected.

Assuming now constant power output, while it should be noted that even if one cell in one stack is disconnected, the battery should still produce the same power:

$$Wtot_M = Wtot_S \quad (Eq.\ 9)$$

This means:

$$Vout_{totM} * \Sigma_1^n Istack_i = Vout_{totS} * ((\Sigma_1^{n-1} Istack_i) + Istack_j) \quad (Eq.\ 10)$$

Turning now to one example of a battery system having the following number of battery cells and number of battery stacks, in which:
k=100 (number of battery cells)
j=10 (number of battery stacks)
$V_{cell\_k}$=3.5 V (for all battery cells)
$R_{cell\_k}$=0.03Ω (for all battery cells)
$W_{tot}$=10230 W Then, from the above equations 5, 7, 9 and 10, and if all battery cells are connected:

$Istack_i$=3 A

For one battery cell disconnected at the battery stack j:

$Istack_i$=3.12 A and $Istack_j$=1.97 A

From the above, it can be noted that the total current has to increase for battery system S to compensate for the disconnected battery cell, and therefore the output voltage will decrease due to the internal resistance.

It can also be noted the battery stack with one less battery cell is now providing less current than the other battery stacks. This is less desirable as the other cells in the other packs will now discharge faster than the one in this battery stack. This may be solved by disconnecting the other battery packs in a schedule, thereby letting the battery pack with one missing (disconnected) battery cell be connected all the time and the other ones sharing. Accordingly, this means that:

$$Wtot_M = Wtot_S = Vout_{totS} * ((\Sigma_1^{n-2} Istack_i) + Istack_j) \quad \text{(Eq. 11)}$$

With the same example as above, if one of the other battery stacks is disconnected at a time, and the same power output will be provided by the system, one gets: $Istack_i$=3.48 A and $Istack_j$=2.34 A As the battery stacks with all battery cells engaged are disconnected one after one, they will experience a mean load of 8/9, which equals: $Istack_{imean}$=3.09 A With three battery stacks disconnected and the same load, one increases the current over the battery stack with the disconnected cell and thus obtains: $Istack_{imean}$=3.21 A and $Istack_j$=3.37 A It should be noted that the more battery stacks that are disconnected, the higher load on the stacks with the disconnected battery cell. In this manner, it becomes possible to balance the discharge rate on this pack relative the others to obtain an even distribution of discharge.

It is also conceivable to disconnect one, or several, battery cells in all battery packs of the battery system to match the battery pack with one battery cell disconnected. These cells may be altered according to a scheme to get equal discharge from all battery cells.

If one battery stack has more charge than the other ones, one may likewise disconnect the other battery stacks one after one, thereby reducing the mean current for them, but keep the higher charged battery stack connected all the time. Thus, it becomes possible to reduce its charge to the same level as the other ones.

Then if one battery cell in a battery stack has higher charge than the other battery cells, one may likewise disconnect the other battery cells one after one, thereby reducing the mean current for these battery cells, but keep the higher charged battery cell connected all the time. Thus, it becomes possible to reduce its charge to the same level as the other ones.

It should also be noted that opposite sequence is applicable during charging. When a cell in a stack gets fully charged, it can be disconnected, and the other cells will then get more current if kept charge voltage for all packs. When the other cells in this stack are full, one may disconnect this stack and only charge the other stacks until they are fully charged.

In view of the above, the method comprises determining 110 a state charge level of each battery cell $3_a$ to $3_n$ of the set of battery stacks $1_a$ to $1_n$. The state charge level of each battery cell of the set of battery stacks is determined by the control unit 8. By way of example, the state charge level of a battery cell is determined according to the equivalent circuit model of a battery cell described in relation to FIG. 2a above. By way of example, the step of determining 110 a state charge of the set of battery cells in the set of the battery stacks comprising the step of monitoring a state charge level of the set of battery cells in the set of the battery stacks by means of a sensor unit (not shown) arranged in connection with set of battery cells.

Next, the method during discharging of the battery system, identifying 120 a battery cell with a lowest state charge level among the battery cells of the set of battery stacks. By way of example, the method in step 120 identifies the battery cell $3_b$ in the battery stack $1_a$ as having the lowest state charge level, which is also partly described in relation to FIG. 2b above. Alternatively, during charging of the battery system, the method in step 120 identifies a battery cell with a highest state charge level among the battery cells of the set of battery stacks. By way of example, the step of identifying a battery cell with a low state charge level during discharging of the battery system or a battery cell with a high state charge level during charging of the battery system is performed by comparing the state charge level of a battery cell with a threshold value. It should also be noted that the method may identify two or more battery cells with equal low state charge level (or high state charge level).

In the following step, the method temporarily interrupting 130 discharging (or charging) of the identified battery cell (i.e. the battery cell with identified low state charge or high state charge), e.g. the battery cell $3_b$ in the battery stack $1_a$. By way of example, the step 130 of temporarily interrupting discharging (or charging) of the identified battery cell is performed by disconnecting 130 the identified battery cell $3_b$ in the corresponding battery stack $1_a$. As described in relation to FIG. 2b-2d above, the identified battery cell can be disconnected in the corresponding battery stack by a bypassing disconnection. The bypassing disconnection can be formed by the switch unit arrangement. As described further below, discharging and charging of the identified battery cell is typically temporarily interrupted until the remaining battery cells have become discharged or charged to substantially similar state charge levels. As mentioned above, the method may identify two or more battery cells with equal low state charge level (or high state charge level. In this situation, step 130 typically includes temporarily interrupting discharging or charging of the identified battery cells (i.e. the battery cells with identified low state charge or high state charge).

Then, in step 140, the method continuing discharging or charging 140 the remaining battery cells of the set of battery stacks. In this context, the term "remaining" refers to all battery cells of the battery system except the identified battery cell of the corresponding battery stack, i.e. the battery cell $3b$ of the battery stack $1a$ above, and as depicted in FIGS. 2b-2d. In other words, the remaining battery cells refers to the other battery cells, i.e. battery cells $3_a$ and $3_c$ to $3_n$, of the corresponding battery stack $1_a$, (thus excluding the identified battery cell $3_b$ in battery stack $1_a$) and the battery cells $3_a$ to $3_n$ of the other battery stacks $1_b$ to $1_n$ of the set of battery stacks $1_a$ to $1_n$.

Among the remaining battery cells of the set of battery stacks, the method then sequentially temporarily interrupting discharging or charging 150 a battery cell $3_a$ to $3_n$ in each one of the other battery stacks $1_b$ to $1_n$ of the set of battery stacks $1_a$ to $1_n$. By way of example, the step of sequentially temporarily interrupting a battery cell in each one of the other battery stacks of the set of battery stacks is performed by sequentially disconnecting a battery cell in each one of the other battery stacks of the set of battery stacks. The step of sequentially temporarily interrupting discharging or charging a battery cell in each one of the other battery stacks of the set of battery stacks can be performed by simultaneously interrupting discharging or charging of one battery cell, e.g. battery cell $3_c$, in each one of the other battery stacks $1_b$ to $1_n$ followed by simultaneously interrupting discharging or charging of another battery cell, e.g. battery cell $3_d$, in each one of the other battery stacks $1_b$ to $1_n$, while the previous interrupted discharging or charging of the one (previous) battery cell (battery cell $3_c$) of each one of the other battery stacks $1_b$ to $1_n$ is resumed.

Alternatively, the step of sequentially temporarily interrupting discharging or charging a battery cell in each one of the other battery stacks of the set of battery stacks is performed by interrupting discharging or charging of one battery cell in one (a first) of the other battery stacks, e.g. battery cell $3_c$ of the battery stack $1_b$, followed by interrupting discharging or charging of one battery cell in another one (a second) of the other battery stacks, e.g. battery cell $3_c$ of the battery stack $1_c$, while the previous interrupted discharging or charging of the one battery cell $3_c$ of the one (the first) battery stack $1_b$ of the other battery stacks $1_b$ to $1_n$ is resumed.

In one example, the step 150 comprising sequentially temporarily interrupting discharging or charging 150 all battery cells $3_a$ to $3_n$ of a battery stack $1_b$ of the other battery stacks $1_b$ to $1_n$ of the set of battery stacks $1_a$ to $1_n$.

In this manner, the corresponding battery stack $1_a$ with the disabled identified battery cell $3_b$ will be connected all the time and the other battery cells $3_a$ to $3_n$ of the other battery stacks $1_b$ to $1_a$ being sequentially connected during discharging or charging. Thereby, the method balances a discharge rate or a charge rate of the battery stacks of the battery stack system.

As mentioned above in relation to step 130, the step of sequentially disconnecting a battery cell in each one of the other battery stacks of the set of battery stacks can be performed by a bypassing disconnection. The bypassing disconnection can be formed by the switch unit arrangement as described in relation to FIGS. 2b-2d.

Further, in step 160, the method controls duration of the step 150 of sequentially temporarily interrupting discharging or charging a battery cell in each one of the other battery stacks of the set of battery stacks based on a battery system characteristics. In this example, the battery pack system characteristic comprises data indicative of the current through each one of the battery stacks of the battery system and the power output of the battery system. The current through a battery stack of the battery system is determined during the step of temporarily interrupting discharging or charging a battery cell in each one of the other battery stacks of the set of battery stacks according to Equation 7 above. The power output of the battery system is determined during the step of temporarily interrupting discharging or charging a battery cell in each one of the other battery stacks of the set of battery stacks according to Equation 8 above.

The current through each one of the battery stacks of the battery system is determined during the step of temporarily interrupting discharging or charging a battery cell in each one of the other battery stacks of the set of battery stacks. Likewise, the power output of the battery system is determined during the step of during temporarily interrupting discharging or charging a battery cell in each one of the other battery stacks of the set of battery stacks.

Moreover, as should be readily appreciated from the above Equations 1 to 11, the battery system characteristic typically, although not strictly required, contains data relating to the number of battery cells of the battery system and determining the internal resistance of the battery cells of the battery as well as the current and power of the battery system and battery stacks when all battery cells are connected in the battery system.

Subsequently, in step 170, state charge levels of the battery cells $3_a$ to $3_n$ of the set of battery stacks $1_a$ to $1_n$ are monitored followed by the step of comparing 180 the monitored state charge levels of the remaining battery cells of the other battery stacks of the set of battery stacks with the state charge level of the identified battery cell of the corresponding battery stack.

Then, in step 190, discharging or charging of the identified battery cell is resumed when state charge levels of the remaining battery cells of the set of battery cells of the set of battery stacks corresponds to the state charge level of the identified battery cell. By way of example, the step of resuming discharging or charging 190 of the identified battery cell is performed by connecting the identified battery cell $3b$ to the other battery cells $3a$ and $3c$ to $3n$ of the corresponding battery stack $1a$.

As mentioned above, it is to be noted that the steps of the method is typically performed by the control unit 8 during use of the battery system by the electrical propulsion system 20. It is also to be noted that the state charge levels of the battery cells are typically obtained by measurements on the battery cells, while the other steps of the method are typically performed on a model of the battery cell, as described above.

Although the figures may show a sequence, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. By way of example, while the system and method is partly described for a method of controlling discharging of the battery system, the example embodiments of the steps, the features of the system and the various equations are likewise applicable for controlling charging of the battery system.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electric vehicle, in particular an electric truck or the like.

The invention claimed is:

1. A method of controlling a battery system in a vehicle during discharging and charging thereof, the battery system comprises a set of battery stacks connected in parallel, each one of the battery stacks having a set of battery cells connected in series, characterized by the method comprising the steps of: determining a state charge level of each battery cell of the set of battery stacks; during discharging of the battery system, identifying a battery cell with a lowest state charge level among the battery cells of the set of battery stacks, or during charging of the battery system, identifying a battery cell with a highest state charge level among the battery cells of the set of battery stacks; temporarily interrupting discharging or charging of the identified battery cell; continuing discharging, or charging, the remaining battery cells of the set of battery stacks; among the remaining battery cells of the set of battery stacks, sequentially temporarily interrupting discharging, or charging, a battery cell in each one of the other battery stacks of the set of battery stacks; controlling duration of the step of sequentially temporarily interrupting discharging or charging a battery cell in each one of the other battery stacks of the set of battery stacks based on a battery system characteristic; monitoring state charge levels of the battery cells of the set of battery stacks; comparing the monitored state charge levels of the battery cells of the other battery stacks of set of battery stacks with the state charge level of the identified battery cell of the corresponding battery stack; and resuming discharging or charging of the identified battery cell when state charge levels of the remaining battery cells of the set of battery cells of the set of battery stacks corresponds to the state charge level of the identified battery cell.

2. Method according to claim 1, wherein the step of temporarily interrupting discharging or charging of the identified battery cell is performed by disconnecting the identified battery cell in the corresponding battery stack.

3. Method according to claim 1, wherein the step of sequentially temporarily interrupting a battery cell in each one of the other battery stacks of the set of battery stacks is performed by sequentially disconnecting a battery cell in each one of the other battery stacks of the set of battery stacks.

4. Method according to claim 1, wherein the step of resuming discharging or charging of the identified battery cell is performed by connecting identified battery cell to the other battery cells of the corresponding battery stack.

5. Method according to claim 1, wherein the step comprising sequentially temporarily interrupting discharging or charging all battery cells of a battery stack of the other battery stacks of the set of battery stacks.

6. Method according to claim 1, wherein the step of determining a state charge of the set of battery cells in the set of the battery stacks comprising the step of monitoring a state charge level of the set of battery cells in the set of the battery stacks by means of a sensor unit arranged in connection with set of battery cells.

7. Method according to claim 1, wherein the step of identifying a battery cell with a low state charge level during discharging of the battery system or a battery cell with a high state charge level during charging of the battery system is performed by comparing the state charge level of a battery cell with a threshold value.

8. Method according to claim 1, wherein the battery pack system characteristic comprises data indicative of the current through each one of the battery stacks of the battery system and the power output of the battery system.

9. Method according to claim 8, wherein the current through a battery stack of the battery system is determined during the step of temporarily interrupting discharging or charging a battery cell in each one of the other battery stacks of the set of battery stacks.

10. Method according to claim 9, wherein the current through a battery stack of the battery system is determined during the step of temporarily interrupting discharging or charging a battery cell in each one of the other battery stacks of the set of battery stacks according to:

$$Istack_j = \frac{\left(\sum_{1}^{k-1} V\,cell_k\right) - V\,out_{tot}}{\sum_{1}^{k-1} R\,cell_k}$$

wherein,
$Istack_j$ is current through a battery stack during the step of temporarily interrupting discharging or charging a battery cell in each one of the other battery stacks of the set of battery stacks,
$Vcell_k$ is internal output voltage from a battery cell of the battery stack during the step of temporarily interrupting discharging or charging a battery cell in each one of the other battery stacks of the set of battery stacks,
$Vout_{tot}$ is output voltage from the battery stack during the step of temporarily interrupting discharging or charging a battery cell in each one of the other battery stacks of the set of battery stacks, and
$Rcell_k$ is internal resistance of the battery cell.

11. Method according to claim 8, wherein the power output of the battery system is determined during the step of temporarily interrupting discharging or charging a battery cell in each one of the other battery stacks of the set of battery stacks.

12. Method according to claim 11, wherein the power output of the battery system is determined during the step of temporarily interrupting discharging or charging a battery cell in each one of the other battery stacks of the set of battery stacks according to:

$$Wtot_S = V\,out_{totS} * \left(\left(\sum_{1}^{n-1} Istack_i\right) + Istack_j\right)$$

wherein,
$Wtot_s$ is total power output of the battery system during the step of temporarily interrupting discharging or charging a battery cell in each one of the other battery stacks of the set of battery stacks,
$Vout_{totS}$ is total output voltage from the battery system during the step of temporarily interrupting discharging or charging a battery cell in each one of the other battery stacks of the set of battery stacks,
$Istack_i$ is current through a battery stack with all battery cells connected, and $Istack_j$ is current through the battery stack during the step of temporarily interrupting discharging or charging a battery cell in each one of the other battery stacks of the set of battery stacks.

13. Method according to claim 1, in which the steps of the method is performed by a control unit.

14. A non-transitory computer readable medium carrying a computer program comprising program code for performing the steps of claim 1 when said program code is run on a computer.

15. A battery system comprising a set of battery stacks connected in parallel, each one of the battery stacks having a set of battery cells connected in series, and a battery control unit, wherein the battery control unit is configured to: determine a state charge level of each battery cell of the set of battery stacks; during discharging of the battery system, identify a battery cell with a lowest state charge level among the battery cells of the set of battery stacks, or during charging of the battery system, identify a battery cell with a highest state charge level among the battery cells of the set of battery stacks; temporarily interrupt discharging or charging of the identified battery cell; continue discharging or charging the remaining battery cells of the set of battery stacks; among the remaining battery cells of the set of battery stacks, sequentially temporarily interrupt discharging or charging a battery cell in each one of the other battery stacks of the set of battery stacks; control duration of the sequentially temporarily interrupted discharging or charging a battery cell in each one of the other battery stacks of the set of battery stacks based on a battery system characteristics; monitor state charge levels of the battery cells of the set of battery stacks; compare the monitored state charge levels of the battery cells of the other battery stacks of set of battery stacks with the state charge level of the identified battery cell of the corresponding battery stack; resume discharging or charging of the identified battery cell when state charge levels of the remaining battery cells of the set of battery cells of the set of battery stacks corresponds to the state charge level of the identified battery cell.

16. A vehicle, comprising a battery system according to claim 15.

* * * * *